United States Patent [19]
Mizutani et al.

[11] Patent Number: 6,159,579
[45] Date of Patent: Dec. 12, 2000

[54] BIAXIALLY ORIENTED POLYESTER FILM FOR HEAT-SENSITIVE TRANSFER RIBBON

[75] Inventors: Kei Mizutani; Hiroshi Tomita, both of Kanagawa, Japan

[73] Assignee: Teijin Limited, Osaka, Japan

[21] Appl. No.: 09/341,510

[22] PCT Filed: Nov. 13, 1998

[86] PCT No.: PCT/JP98/05123

§ 371 Date: Jul. 13, 1999

§ 102(e) Date: Jul. 13, 1999

[87] PCT Pub. No.: WO99/25563

PCT Pub. Date: May 27, 1999

[30] Foreign Application Priority Data

Nov. 18, 1997 [JP] Japan ................... 9-317228

[51] Int. Cl.$^7$ .......................... B32B 27/06; B32B 27/18; B32B 27/20; B32B 27/36
[52] U.S. Cl. .......................... 428/141; 428/217; 428/323; 428/338; 428/480; 428/903.3; 428/910; 427/146; 427/148
[58] Field of Search ..................... 428/141, 217, 428/323, 338, 480, 694 SG, 903.3, 910; 427/146, 148

[56] References Cited

U.S. PATENT DOCUMENTS

| | | |
|---|---|---|
| 3,980,611 | 9/1976 | Anderson et al. . |
| 5,478,632 | 12/1995 | Kurz et al. . |
| 5,595,819 | 1/1997 | Anderson et al. ............... 428/330 |

FOREIGN PATENT DOCUMENTS

| | | |
|---|---|---|
| 58-067448 | 4/1983 | Japan . |
| 63-072729 | 4/1988 | Japan . |
| 63-235336 | 9/1988 | Japan . |
| 63-235337 | 9/1988 | Japan . |
| 3-199239 | 8/1991 | Japan . |
| 4-41297 | 2/1992 | Japan . |
| 6-008656 | 1/1994 | Japan . |
| 62-111719 | 4/1994 | Japan . |
| 6-191170 | 7/1994 | Japan . |
| 7-114722 | 5/1995 | Japan . |
| 9-124603 | 7/1997 | Japan . |
| 9193241 | 7/1997 | Japan . |
| 63-300423 | 12/1998 | Japan . |

*Primary Examiner*—Vivian Chen
*Attorney, Agent, or Firm*—Sughrue, Mion, Zinn, Macpeak & Seas, PLLC

[57] ABSTRACT

A film free from the problem of the generation of abrasion powder on an inner part of a transporting system contacting with the surface of a ribbon in a heat-sensitive transfer printer in the case of using the film as a heat-sensitive transfer ribbon and giving a heat-sensitive transfer ribbon having remarkably improved windability is produced by using a biaxially oriented polyester film having a thickness of from 1.0 to 10.0 μm and composed of a polyester composition containing two or more kinds of inert particles having different average particle diameters and each containing at least one kind of element selected from Al, Si, Ca and Mg, characterized in that the center-line average roughness (SRa) and the 10 points average roughness (SRz) of the film surface are 10 to 80 nm and 700 to 1,500 nm, respectively, the air-escaping rate between films is 20 to 120 mmHg/hr, and the end staggering width is 0 to 500 μm when a film roll slit to ½ inch wide is wound at a speed of 250 m/min.

7 Claims, No Drawings

BIAXIALLY ORIENTED POLYESTER FILM FOR HEAT-SENSITIVE TRANSFER RIBBON

TEHCNICAL FIELD

The present invention relates to a biaxially oriented polyester film for a transfer material (heat-sensitive transfer ribbon) for heat-sensitive transfer printer, more particularly it relates to a biaxially oriented polyester film giving little abrading action on mechanical parts in a printer and having extremely excellent windability not only in the winding of a roll in film manufacture but also in the slitting of the produced ribbon after the application of an ink layer and a back-coating layer. Especially, the present invention relates to a biaxially oriented polyester film applicable not only for a heat-sensitive transfer ribbon to perform the heat-transfer by the contact of an ink layer with an image-receptor but also for a sublimation-type heat-sensitive transfer ribbon to perform the heat-transfer printing in a non-contacting state of the ink layer and the image receptor.

BACKGROUND ARTS

Various printing systems were developed according to the progress of office automation. Heat-sensitive transfer recording system is attracting interest among these systems owing to its low noise-generation in printing and simple operation. In this system, an image-receiving member (e.g. common paper and plastic sheet) is placed as a transfer object at the side of hot-melt ink layer of a heat-sensitive transfer ribbon produced by placing a hot-melt ink layer on a base film, a thermal head is brought into contact with the heat-sensitive transfer ribbon at the side opposite to the ribbon, a thermal pulse is applied to the thermal head corresponding to a recording signal to melt the hot-melt ink layer at a specific position and the molten ink is transferred to the surface of the image-receiving member to record a letter or drawing.

A polyester film industrially available as a thin film and having excellent mechanical strength has been used as the base film constituting the heat-sensitive transfer ribbon.

Disclosed polyester films for heat-sensitive transfer ribbon include a film specifying the density of protrusions on the film surface (40 to 200/0.01 mm$^2$ for protrusions having a diameter of 1 $\mu$m or larger and smaller than 5 $\mu$m and 400 to 2,000/0.01 mm$^2$ for protrusions having a diameter of 0.5 $\mu$m or larger and smaller than 1 $\mu$m) and a protrusion height (0.10 to 0.50 $\mu$m) (JP-A 62-299389 (hereunder JP-A means "Japanese Unexamined Patent Publication")), a polyethylene naphthalate film having a Young's modulus of 600 kg/mm$^2$ or above in machine direction (JP-B 6-30881 (hereunder JP-B means "Japanese Examined Patent Publication")) and a film having a thermal dimensional change of 5% or less in transversal direction (Japanese Patent 2581270). These films have improved film slipperiness and heat-resistance in the case of using as a heat-sensitive transfer ribbon.

However, it has been clarified that the following two problems are inherent to the heat-sensitive transfer ribbons produced from these films.

The first problem is the generation of abraded powder by the friction of the heat-sensitive transfer ribbon with a printer part contacting with the heat-sensitive transfer ribbon in high-speed printing to cause defective print.

The second problem is the defective winding caused by the breakage and creasing of a heat-sensitive transfer ribbon in the slitting and winding of a broad raw film roll to the width of the product ribbon (hereunder called as slitting operation) in the process for the production of a heat-sensitive transfer ribbon.

There was no actualization of these problems even by using the above conventional films since the printing speed of conventional printer was slow, the manufacturing quantity of heat-sensitive transfer ribbon was small to dispense with the high-speed slitting process and the windability was ensured to an extent by the improvement of the winding condition of a slitter and the back coating layer and the ink layer of the film.

However, the solution of the above two problems became impossible by the use of conventional heat-sensitive transfer ribbon because of the requirement on the improvement of the productivity or the increase in the slitting speed to cope with the increase in the demand of the heat-sensitive transfer ribbon and the requirement on high-speed printing owing to the improvement of the performance of these printing apparatuses, according to the recent spread of facsimile, bar code printing, heat-sensitive photoprinter for amusement (Print Club (commercial name), etc.) and low-cost printer for computer allowing the printing on plain paper.

JP-A 9-193241 discloses a film having a surface roughness of smaller than 30 nm, a surface gas flow time of shorter than 2,900 seconds and improved windability in the form of film and usable mainly for capacitors. The use of the film for a heat-sensitive transfer ribbon, however, does not solve the above-mentioned abrasion resistance problem and gives insufficient windability as a heat-sensitive transfer ribbon.

The necessity to solve the above problems by the surface properties of a base film has been further increased especially by the tendency of the thinning of the back coating layer and the ink layer for the cost reduction of a heat-sensitive transfer ribbon.

Problems to be Solved by the Invention

The object of the present invention is to provide a biaxially oriented polyester film for heat-sensitive transfer ribbon having excellent abrasion resistance and windability in the case of using as a heat-sensitive transfer ribbon. More particularly, the object of the present invention is to provide a biaxially oriented polyester film for heat-sensitive transfer ribbon free from generation of abraded powder in a printing apparatus, showing stable windability even by slitting a heat-sensitive transfer ribbon at a high speed and exhibiting stable windability as a base film in high-speed winding.

Means for Solving the Problems

The present invention has the following constitution for achieving the above object. Namely, the constitution of the present invention is a biaxially oriented polyester film for heat-sensitive transfer ribbon having a thickness of from 1.0 to 10.0 $\mu$m and composed of a polyester composition containing two or more kinds of inert particles having different average particle diameters, characterized in that each of said inert particles contains at least one kind of element selected from Al, Si, Ca and Mg, the center-line average roughness (SRa) and the 10 points average roughness (SRz) of the film surface are 10 to 80 nm and 700 to 1,500 nm, respectively, the air-escaping rate between films is 20 to 120 mmHg/hr, and the end staggering width is 0 to 500 $\mu$m when a film roll slit to ½ inch wide is wound at a speed of 250 m/min.

The polyester constituting the film of the present invention is a polyester containing an aromatic dicarboxylic acid as a main acid component and an aliphatic glycol as a main glycol component. Such polyester is an essentially linear polymer and has a film-forming property, especially film-forming property by melt-molding. The aromatic dicarboxylic acid is, for example, terephthalic acid, isophthalic acid, naphthalenedicarboxylic acid, diphenyoxyethanedicarboxylic acid, diphenyldicarboxylic acid, diphenyl ether dicarboxylic acid, diphenylsulfone dicarboxylic acid, diphenyl ketone dicarboxylic acid and anthracenedicarboxylic acid. The aliphatic glycol is, for example, a polymethylene glycol having a carbon number of from 2 to 10, such as ethylene glycol, diethylene glycol, trimethylene glycol, tetramethylene glycol, pentamethylene glycol, hexamethylene glycol and decamethylene glycol or an alicyclic diol such as cyclohexanedimethanol.

In the present invention, the polyester preferably contains an alkylene terephthalate and/or an alkylene naphthalate as a main constituent component.

Especially preferable polyesters are polyethylene terephthalate, polyethylene-2,6-naphthalate or a copolymer containing terephthalic acid and/or 2,6-naphthalenedicarboxylic acid accounting for not less than 80 mol % of the total dicarboxylic acid component and ethylene glycol accounting for not less than 80 mol % of the total glycol component. In this case, not more than 20 mol % of the total acid component may be the above-mentioned aromatic dicarboxylic acid other than terephthalic acid and 2,6-naphthalenedicarboxylic acid, aliphatic dicarboxylic acid such as adipic acid or sebacic acid or alicyclic dicarboxylic acid, etc., such as cyclohexane-1,4-dicarboxylic acid. Not more than 20 mol % of the total glycol component may be the above-mentioned glycols other than ethylene glycol, for example, an aromatic diol such as hydroquinone, resorcinol and 2,2-bis(4-hydroxyphenyl)propane, a polyalkylene glycol (polyoxyalkylene glycol) such as polyethylene glycol, polypropylene glycol and polytetramethylene glycol, etc.

The polyester of the present invention includes a polymer copolymerized or bonded with not more than 20 mol % of a component originated from an oxycarboxylic acid, e.g. an aromatic oxy-acid such as hydroxybenzoic acid or an aliphatic oxy-acid such as ω-hydroxycaproic acid based on the sum of the dicarboxylic acid component and the oxycarboxylic acid component.

The polyester of the present invention includes a polymer copolymerized with a tri- or higher functional polycarboxylic acid or polyhydroxy compound such as trimellitic acid or pentaerythritol in an amount to give an essentially linear polymer, for example, not more than 2 mol % based on the total acid component.

The above-mentioned polyester is known as it is and producible by conventional methods. The intrinsic viscosity of the polyester is preferably between 0.4 and 0.9 measured as an o-chlorophenol solution at 35° C.

The generation of abrasion powder caused by the contact of a film with a machine part in a printer can be suppressed and a surface property capable of simultaneously improving the windability of the film in the form of a roll and the windability of the produced ribbon can be attained by adding two or more kinds of inert particles having different average particle diameters to the polyester for the film of the present invention.

Two or more kinds of inert particles to be added to the polyester may be natural material obtained simply by crushing or pulverizing rocks or synthetic material obtained by adjusting the particle diameter of a mineral synthesized in molten state, and a synthetic material is preferable from the viewpoint of the quality stabilization of the film.

There is no particular restriction on the method for the synthesis of the synthetic material, and any synthetic method achieving the object of the present invention can be used. An example of the melt synthesis comprises the compounding of natural feldspar, silica rock and borax at proper ratios, thorough mixing of the mixture with a mixer to get a mixture having further improved uniformity of each component, melting of the obtained mixture in a conjunction furnace or a tank furnace, cooling and drying of the product to obtain a synthetic raw stone, crushing of the raw stone with a sand grinder, etc., and the decanter treatment as an optional step to obtain fine particles having desired particle diameter and particle diameter distribution. The crushing of the synthetic raw stone can be performed by dry-crushing, wet-crushing or the combination of both methods, and particles having desired particle diameter and particle shape can be produced by any method.

A melt synthesis product or a melt sintered product is preferable to natural material also in the case that the inert particle is double oxide particle to stabilize the qualities such as particle diameter and particle size distribution. The synthesis and sintering in the above case are carried out generally by sintering in an oven, however, the process is not restricted to the oven sintering process.

Each of two or more kinds of inert particles in the present invention is required to contain at least one kind of element selected from Al, Si, Ca and Mg. The inert particle is preferably the oxide and/or carbonate of the above metal elements to enable the mass production at a low cost. Concrete examples of preferable inert particles are silicon dioxide (including hydrate, silica sand, quartz, etc.), alumina having various crystal forms, silicate containing not less than 30% by weight of $SiO_2$ (for example amorphous or crystalline clay minerals), an aluminosilicate (including calcined product and hydrate), chrysotile, zircon, fly ash, etc., Ca and Mg carbonates, a spinel-type oxide such as $MgAl_2O_4$ and a modified spinel-type oxide composed of alumina and other oxide. More preferable examples are inert inorganic oxide particles composed of Si and/or Al, such as $SiO_2$, $Al_2O_3$ and $SiO_2$—$Al_2O_3$. Among the above substances, $SiO_2$, porous silica and/or their agglomerated particles and kaolin consisting of an aluminosilicate are especially preferable to ensure the impartment of the preferable film properties at reduced film production cost.

It is also preferable in the present invention that two kinds (A,B) of inert particles are used in the invention, the average particle diameter of the inert particle A is 0.3 to 1.0 μm, preferably 0.5 to 1.0 μm, especially 0.7 to 1.0 μm and the other inert particle B has an average particle diameter of 0.5 to 5.0 μm, preferably 1.0 to 3.0 μm, especially 1.5 to 2.8 μm and that the average particle diameter ($d_A$) of the inert particle A and the average particle diameter ($d_B$) of the inert particle B satisfy the relationship of $d_A < d_B$.

The inert particle A having relatively small average diameter is effective for forming surface protrusions on the film and suppressing the generation of abraded particles especially in a printer.

The abrasion resistance of film is lowered when the average particle diameter of the inert particle A is smaller than 0.3 μm, and the printability with a printer is lowered when the average particle diameter exceeds 1.0 μm.

The addition amount of the inert particle A to the polyester is preferably between 0.05 and 1.0% by weight. The amount is further preferably between 0.1 and 0.7% by weight, especially between 0.2 and 0.5% by weight. When the amount of the inert particle A is less than 0.05% by weight, the surface of the film becomes extremely flat to hinder the escape of air between the films, the abrasion resistance is lowered to cause the scratch and the generation of white powder during the transport of the produced ribbon in a printer and sometimes the produced ribbon is rated as defective product. On the other hand, the addition of more than 1.0% by weight of the inert particle causes excessive roughening of the film surface and high energy is necessary in the case of printing with the produced ribbon. The high energy induces the breakage of the film and increases the printing defects caused by the falling-off of the inert particles near the film surface and the deposition of the powder on the tip end of a printer head.

The inert particle B mainly has the effect of developing the windability of the film.

The inert particle B preferably has high Vickers hardness to decrease the damage on the protrusions formed on the polyester film in the case of transporting the produced ribbon in the printer, and the Vickers hardness is preferably higher than that of the inert particle A.

The Vickers hardness is measured in conformity to the method A described in ASTM D2240.

The inert particle B preferably has an average particle diameter of from 0.5 to 5.0 μm. When the average particle diameter is smaller than 0.5 μm, the air-escape speed abruptly decreases to disable the stable winding, and when the average particle diameter of the inert particle B exceeds 5.0 μm, the protrusion on the film surface breaks through the back-coating layer or the ink layer to cause the defective printing.

The addition amount of the inert particle B is preferably between 0.005 and 0.5% by weight based on the polyester. The windability of the film becomes poor when the addition amount is smaller than 0.005% by weight and the printability of the produced ribbon is lowered at the addition amount exceeding 0.5% by weight.

The average particle diameters of the inert particles A and B were measured by using a Centrifugal Particle Size Analyzer, Type CP-50 manufactured by Shimadzu Corp. In the case of using an agglomerated particle such as agglomerated silica as the inert particle, the average particle diameter means the average diameter of secondary particles.

As mentioned above, the average particle diameter of the inert particle B is preferably larger than that of the inert particle A to realize the effect of each particle.

The film of the present invention is necessary to have a center-line average roughness (SRa) and a 10 points average roughness (SRz) of 10 to 80 nm and 700 to 1,500 nm, respectively. The windability of the film is undesirably lowered when the center-line average roughness (SRa) is smaller than 10 nm or the 10 points average roughness (SRz) is smaller than 700 nm and, on the other hand, the abrasion resistance is lowered to an undesirable level when the center-line average roughness (SRa) exceeds 80 nm or the 10 points average roughness (SRz) exceeds 1,500 nm.

The center-line average roughness (SRa) and the 10 points average roughness (SRz) of the film surface can be adjusted within the above ranges by selecting the average particle diameter and the addition amount of the inert particles to be added to the polyester, concretely as mentioned above, by using two kinds of inert particles (A,B) wherein the average particle diameter ($d_A$) and the addition amount of the inert particle A is 0.3 to 1.0 μm and 0.05 to 1.0% by weight, respectively, the average particle diameter ($d_B$) and the addition amount of the inert particle B is 0.5 to 5.0 μm and 0.005 to 0.5% by weight, respectively, and the particles satisfy the relationship of $d_A < d_B$.

The center-line average roughness (SRa) and the 10 points average roughness (SRz) are defined by JIS-B0601 and JIS-B0602, respectively.

The film of the present invention has an air-escaping rate between films of 20 to 120 mmHg/hr, preferably 40 to 120 mmHg/hr, and the end staggering width of a film roll slit to ½ inch wide is 0 to 500 μm, preferably 0 to 250 μm at a winding speed of 250 m/min.

When the air-escaping rate between films is lower than 20 mmHg/hr, the windability is lowered to undesirable level and, on the other hand, when the rate exceeds 120 mmHg/hr, crease is generated on the film after winding.

The requirement on the ranges of the air-escaping rate between films and the end staggering width can be satisfied by selecting the average particle diameters and/or addition amounts of two or more kinds of inert particles. Concretely, the air-escaping rate between films can be increased by increasing the average particle diameter of the particles having larger average particle diameter among two or more kinds of inert particles and the end staggering width can be decreased by increasing the addition amount of the particle having smaller average particle diameter among two or more kinds of inert particles.

The air-escaping rate between films is determined by stacking twenty film sheets cut to 8 cm×5 cm, opening an equilateral triangular hole having a side length of 2 mm at the center of each of the lower nineteen sheets and measuring the lowering of the pressure (mmHg) per unit time using a digital Bekk smoothness tester (product of Toyo Seiki Industries Co., Ltd.). The end staggering width is measured by winding a polyester film of 400 m long slit to ½ inch on an aluminum core having a diameter of 8 cm and a winding part width of 2 cm in an atmosphere conditioned to 25° C. and 40% humidity at a winding speed of 30 m/min under a tension of 50 g while preventing the creasing of the film, rewinding 300 m of the wound film on the same aluminum core placed parallel to the wound film at a center-to-center distance of 300 mm at a speed of 250 m/min under a tension of 50 g, measuring the end staggering width of the film by a laser length measuring machine manufactured by KEYENCE Corp. during winding, repeating the measurements 10 times, selecting 8 data omitting the maximum and the minimum values and using the average value of the 8 data as the end staggering width.

A biaxially oriented polyester film for heat-sensitive transfer ribbon satisfying both of abrasion resistance and windability can be produced by adjusting all of the center-line average roughness (SRa), the 10 points average roughness (SRz), the air-escaping rate between films and the end staggering width to satisfy the above ranges.

The film of the present invention preferably has a dimensional change of between −8 and +8%, more preferably −5 and 30 5% in transversal direction at 200° C. The dimensional change at 200° C. is defined as the dimensional change measured by heating a film from 0° C. to 200° C. at a heating rate of 5° C./min.

The film of the present invention can be manufactured by conventional methods such as successive biaxial drawing method and simultaneous biaxial drawing method. It can be manufactured especially by a successive biaxial drawing method under the following conditions.

The film is manufactured by drying a polyester composition, melting at 280° C. or above, preferably at 280 to 300° C., extruding through a die (e.g. T-die or I-die) on a chilling drum, cooling the extrudate to obtain an undrawn film, drawing the undrawn film in one direction (for example, machine direction or transversal direction) at 70 to 150° C., preferably at 80 to 130° C. at a draw ratio of 2 to 7, preferably 3 to 5, successively drawing the uniaxially drawn film in the direction perpendicular to the former drawing direction at 90 to 150° C., preferably 100 to 140° C. at a draw ratio of 2 to 7, preferably 3 to 5, and heat-setting the product at 200 to 250° C. for 0.1 to 30 seconds. A concrete example of an especially preferable production process is the production of an undrawn film from a polyester composition at a melting temperature of 290° C., the successive drawing of the undrawn film in machine direction at 90° C. at a draw ratio of 3.6, the drawing in transversal direction at 120° C. at a draw ratio of 3.9 and the heat-setting of the biaxially drawn film at 220° C. for 3 seconds.

The polyester composition constituting the film of the present invention may be a polyester composition containing reclaimed and recycled polyester composition as a part or total of the composition. The reclaimed and recycled polyester composition means a polyester composition composed of a film or a polyester polymer unsuitable for finished product and generated in a polyester film manufacturing process or a polyester film fabrication process such as a heat-sensitive transfer ribbon manufacturing process. Concretely, it is a film generated in the polyester film manufacturing process and unsuitable for finished product because of failing in the satisfaction of physical quality standards such as thickness or a film scrap left after the slitting of a film to the width of the product.

These polyester compositions were discarded as wastes heretofore, however, it is preferable to use these polyester compositions as the polyester composition constituting the film of the present invention because the use of the reclaimed composition is effective for reducing the production cost of the film and reducing the amount of waste.

The composition of the recycled and reclaimed polyester composition and the mixing ratio of the composition in the case of using the composition by mixing with a new material (virgin material) are arbitrarily selectable provided that the film produced therefrom satisfies the essential requirements of the present invention. Above all, the reclaimed and recycled polyester composition is especially preferably derived from the film of the present invention.

In the case of producing the film of the present invention exclusively from a polyester composition recycled and reclaimed from a film, the center-line average roughness (SRa(1)) of the surface of the film before recycling and the center-line average roughness (SRa(2)) of the surface of the film produced exclusively from the recovered film preferably satisfy the following formula.

$$0.8 \leq SRa(2)/SRa(1) \leq 1.2$$

The thickness of the film of the present invention is preferably from 1.0 to 10.0 $\mu$m. When the thickness is thinner than 1 $\mu$m, crease is generated during printing with a printer to disable smooth winding. Further, the film is undesirable because the breakage of ribbon occurs frequently during printing. On the other hand, a film having a thickness exceeding 10 $\mu$m is also undesirable because high energy has to be applied to the head for printing.

The film of the present invention is suitable for a heat-sensitive transfer ribbon.

A heat-sensitive transfer ribbon can be produced by applying a heat-sensitive transfer ink layer to a surface of the film of the present invention and applying a back-coating layer to the reverse side of the film. The film of the present invention may be subjected as necessary to pretreatment such as corona discharge treatment and undercoating.

There is no particular restriction on the heat-sensitive transfer ink constituting the heat-sensitive transfer ink layer to be formed on one surface of the film of the present invention, and conventional heat-contact ink and sublimation ink can be used as the transfer ink.

A heat-contact ink layer is constructed concretely by using a binder component and a color component as main components and optionally a softener, a flexibilizer, a melting point modifier, a smoothing agent, a dispersing agent, etc., as additive components. These components are composed of a combination of properly selected conventional materials. Concrete examples of the binder component are waxes and various low-melting polymers such as paraffin wax, carnauba wax and ester wax, and concrete examples of the color component are carbon black and various organic or inorganic pigment or dye.

A sublimable dye dispersed in a resin binder can be used as the heat-sublimation ink layer. A dye quickly sublimable within a relatively narrow temperature range near the transfer temperature is ideal as the sublimable dye. Most dyes usable for heat transfer printing have a molecular weight of from 230 to 370, and the dye having the molecular weight of the above range exhibits sublimation characteristics suitable for dyeing and has the molecular size easily diffusible in the dyeing object. The dye preferably has a structure free from ionic groups such as sulfonic acid group and carboxyl group and properly containing polar groups such as hydroxyl group, amino group, nitro group and sulfone group. The resin binder preferably has a property to enable easy sublimation of the dye molecule and homogeneous dispersion of the dye. Examples of such binder are cellulosic resin, acrylic resin, polyvinyl alcohol and polyamide, however, the binder is not limited to the examples.

These heat-sensitive transfer ink layers can be applied to the film of the present invention by conventional methods such as a hot-melt coating method, a gravure coating method in a state added with a solvent, a reverse coating method, a slit die coating method, etc.

It is preferable to apply a back-coating layer on the surface opposite to the face laminated with the heat-sensitive transfer ink layer of the film of the present invention.

The back coating layer is effective for preventing the thermal sticking in case of contacting the film with a thermal head, and known components can be used as the constituent components of the back coating layer. Concretely, the layer is composed mainly of a lubricant such as waxes, higher fatty acid and its derivative, silicon compound and fluorine compound or a combination of the above lubricant with inorganic particles, crosslinked organic particles, fluororesin particles, etc. The application of the back coating layer to the film of the present invention can be carried out by coating the film with the back coating material in the form of aqueous solution or dispersion in the film-forming process and subjecting the coated film to drying, drawing and heat-setting treatments or by applying the back coating material in the form of aqueous system or organic solvent system to the film after completing the orientation and crystallization of the film and drying the applied material.

EXAMPLES

The present invention is further explained in detail by the following examples.

Various physical values and characteristics in the present invention are measured and defined as follows.

(1) Average Diameter of Particles

The average particle diameter was measured by using Centrifugal Size Analyzer Type CP-50 manufactured by Shimadzu Corp. The particle diameter corresponding to 50 mass % was read from a cumulative curve showing the relationship between the particle diameter and the residual amount of the particles calculated based on the obtained centrifugal precipitation curve, and the diameter was used as the average particle diameter (refer to the Book "Particle Size Measuring Technique" published by the Nikkan Kogyo Shimbun, Ltd., 1975, p.242–247).

(2) Average Diameter of Particles in a Film

When the added inert particle is a secondary particle consisting of agglomerated primary particles, the following method was adopted because the particle diameter obtained by the average diameter measurement shown in the item (1) sometimes became smaller than the actual average particle diameter.

The film containing the particles was sliced in the direction of cross-section to ultra-thin slices having a thickness of 100 nm and the agglomerated particles (secondary particles) were observed and photographed by using a transmission electron microscope (JEM-1200EX manufactured by JEOL, Ltd.) at a magnification of about 10,000. The diameter of a circle having an area equal to that of the particle was determined on 1,000 particles by using an image analyzer and the number-average diameter was used as the average secondary diameter. The material of the particle can be determined e.g. by the quantitative analysis of metallic element using SEM-XMA, ICP, etc. The average primary particle diameter was measured in conformity to the method for the measurement of the average secondary particle diameter except for the use of the magnification of 100,000 to 1,000,000 in photographing with a transmission electron microscope.

(3) Addition Amount of Each Kind of Inert Particles

The addition amount of particles was determined by burning 100 grams of polyester film before recovery in a platinum crucible in an oven heated at about 1000° C. for 3 hours or longer, mixing the burnt residue in the crucible with terephthalic acid (powder) to form a tablet-formed plate of 50 grams weight, subjecting the tablet to wavelength dispersive fluorescent X-ray spectroscopy, and converting the obtained count of each element into the addition amount by using a calibration curve prepared beforehand. The X-ray tube for the measurement of fluorescent X-ray is preferably a Cr tube, and an Rh tube is also usable. The X-ray output was set to 4 KW and the analyzing crystal was changed for each element to be analyzed.

When different inert particles contained the same element, the relative addition amount was determined from the particle image obtained by the transmission electron microscope. The total addition amount of inert particles to be used as a base for the above estimation was measured by the following method (4).

(4) Total Addition Amount of Inert Particles

The total addition amount of particles was determined by burning 100 grams of a polyester film in a platinum crucible in an oven heated at about 1000° C. for 3 hours or longer, mixing the burnt residue in the crucible with terephthalic acid (powder) to form a tablet-formed plate of 50 grams weight, subjecting the tablet to wavelength dispsersive fluorescent X-ray spectroscopy, and converting the obtained count of each element into the addition amount by using a calibration curve prepared beforehand. The X-ray tube for the measurement of fluorescent X-ray is preferably a Cr tube, and an Rh tube is also usable. The X-ray output was set to 4 KW and the analyzing crystal was changed for each element to be analyzed.

(5) Surface Roughness of Film (SRa, SRz)

The center-line average roughness (SRa) is a value defined in JIS-B0601, and the 10 points average roughness (SRz) is a value defined in JIS-B0602. Both values were measured in the present invention by using a tracer-type surface roughness tester (SURFCORDER SE-30C) manufactured by Kosaka Laboratory Ltd. The measurement conditions were as follows.

(a) Stylus tip radius: 2 $\mu$m (b) Measurement pressure: 30 $\mu$mg (c) Cut-off: 0.25 mm (d) Measurement length: 2.5 mm (e) Rearrangement of data: Measurements were repeated six times on the same specimen, the highest one was omitted and the average of the remaining 5 data was used as the average roughness.

(6) Air-Escaping Rate of Film

The windability of a film was expressed by the air-escaping rate in stacked state and the end staggering width of wound film roll. The air-escaping rate was determined by stacking twenty film sheets cut to 8 cm×5 cm before recovery, opening an equilateral triangular hole having a side length of 2 mm at the center of each of the lower nineteen sheets and measuring the lowering of the pressure (mmHg) per unit time using a digital Bekk smoothness tester (product of Toyo Seiki Industries Co., Ltd.).

(7) End Staggering Width of Film

The end staggering width was measured by winding a polyester film of 400 m long slit to ½ inch on an aluminum core having a diameter of 8 cm and a winding part width of 2 cm in an atmosphere conditioned to 25° C. and 40% humidity at a speed of 30 m/min under a tension of 50 g while preventing the creasing of the film, rewinding 300 m of the wound film on the same aluminum core placed parallel to the wound film at a center-to-center distance of 300 mm at a speed of 250 m/min under a tension of 50 g, measuring the end staggering width of the film by a laser length measuring machine manufactured by KEYENCE Corp. during winding, repeating the measurements 10 times and using the average value of 8 data omitting the maximum and the minimum values as the end staggering width ($\mu$m).

(8) Abrasion Resistance of Film (White Powder, Scratch)

A film slit to ½ inch wide was brought into contact with a fixed guide pin formed by bending a sintered SUS plate in cylindrical form and having insufficient surface finish (center-line surface roughness (Ra); 0.15 nm) at a contact angle of 60° in an atmosphere of 20° C. and 60% humidity and transported (rubbed) at a speed of 250 m/min under an inlet tension of 50 grams. After transporting 200 m of the film, the amount of abraded powder (white powder) deposited on the fixed guide pin and the number of scratches on the transported film were evaluated by the following criterion.

Judgement of Abraded Powder (White Powder)

⊚: Absolutely no abraded powder was visible.

○: Abraded powder was faintly visible.

Δ: The presence of abraded powder was recognizable at a glance.

×: Abraded powder was thickly deposited.

Judgement of Scratch

⊚: Absolutely no scratch was visible.

○: One to five scratches were visible.

Δ: Six to fifteen scratches were visible.

×: The number of scratches was 16 or more.

(9) Windability of Produced Ribbon in Slitting

One thousand (1,000) meters of a heat-sensitive transfer ribbon slit to 3 cm wide was wound on an aluminum core having an outer circumference of 3 inches and provided with a winding part having a width of 4 cm and a thickness of 3 mm under a tension of 100 g while increasing the winding speed from 20 m/min at an interval of 20 m/min, the maximum speed capable of winding 1,000 m of the heat-sensitive transfer ribbon without causing the end staggering was determined and the windability was evaluated by the following criterion.

×: Less than 100 m/min

Δ: 100 m/min or more and less than 200 m/min

○: 200 m/min or more and less than 300 m/min

◎: 300 m/min or more

(10) Vickers Hardness

Vickers hardness was measured by the method A described in ASTM D2240.

The measurement was repeated five times using the Type MD-1 hardness tester manufactured by Kobunshi Keiki Co., Ltd., and the average of the five data was used as the Vickers hardness value.

Examples 1 to 9 and Comparative Examples 1 to 8

A polyethylene terephthalate having an intrinsic viscosity of 0.56 (in o-chlorophenol at 35° C.) was produced by polymerizing dimethyl terephthalate and ethylene glycol by conventional method adding manganese acetate as a transesterification catalyst, antimony trioxide as a polymerization catalyst, phosphorous acid as a stabilizer and particles shown in the Tables 1 to 4 as lubricants. The pellets of the polyethylene terephthalate were dried at 170° C. for 3 hours, supplied to the hopper of an extruder, melted at 280 to 300° C., and extruded through a single-layer die on a rotary chilling drum having a surface finish of about 0.3 s and surface temperature of 20° C. to obtain an undrawn film having a thickness of about 65 μm. The produced undrawn film was preheated to 75° C., drawn 3.6 times between a low-speed roll and a high-speed roll under heating with a single IR heater placed 15 mm above the film and having a surface temperature of 800° C., quenched, supplied to a stenter and drawn 3.9 times in transversal direction at 120° C. The biaxially oriented film produced by this process was heat-set for 5 seconds at 205° C. to obtain a heat-set biaxially oriented polyester film having a thickness of 4.6 μm. The film thickness was controlled by varying the rotational speed of the extruder to change the thickness of the undrawn sheet. Characteristics of these biaxially oriented polyester films are shown in the Tables 1 to 4.

A transfer ink layer was formed on a surface of the film by applying a heat-sensitive transfer ink coating agent having the following composition to the surface by hot-melt coating process with a hot roll in an amount to get a coating film thickness of 5 μm. The windability data of the obtained product ribbon in slitting are shown in the Tables 1 to 4.

Composition of Heat Transfer Ink

| | |
|---|---|
| Magenta dye (MS Red G) | 3.5% by weight |
| Polyvinyl acetoacetal resin | 3.5% by weight |
| Methyl ethyl ketone | 46.5% by weight |
| Toluene | 46.5% by weight |

Effect of the Invention

The present invention enables the production of a biaxially oriented polyester film having high abrasion resistance and giving a product ribbon having good windability in slitting and has high industrial value.

TABLE 1

| | | | Example 1 | Example 2 | Example 3 | Example 4 |
|---|---|---|---|---|---|---|
| Inert particle (A) | Kind | | Kaolin | Kaolin | Kaolin | ag-po-Si |
| | Constitution element | | Si, Al | Si, Al | Si, Al | Si |
| | Vickers hardness | — | 80 | 80 | 80 | 170 |
| | Addition amount | wt. % | 0.3 | 0.15 | 0.15 | 0.2 |
| | Average diameter dA | μm | 0.66 | 0.66 | 0.66 | 0.18 |
| | Average primary diameter | μm | — | — | — | 0.012 |
| | Production method | | Synthesis | Synthesis | Synthesis | Synthesis |
| Inert particle (B) | Kind | | po-Si | po-Si | po-Si | po-Si |
| | Constitution element | | Si | Si | Si | Si |
| | Vickers hardness | — | 275 | 275 | 275 | 275 |
| | Addition amount | wt. % | 0.05 | 0.01 | 0.05 | 0.05 |
| | Average diameter dB | μm | 2.3 | 2.3 | 2.3 | 2.3 |
| | Production process | | Synthesis | Synthesis | Synthesis | Synthesis |
| Film thickness | | μm | 4.6 | 4.6 | 4.6 | 4.6 |
| SRa | | nm | 32 | 22 | 25 | 35 |
| SRz | | nm | 1200 | 1350 | 1420 | 1370 |
| Air escaping rate | | mmHg/hr | 85 | 55 | 40 | 68 |
| End staggering width | | μm | 40 | 65 | 54 | 57 |
| Abrasion resistance | White powder | | ◎ | ○ | ○ | ○ |
| | Scratch | | ◎ | ○ | ○ | ○ |
| Windability of product ribbon in slitting | | | ◎ | ○ | ◎ | ○ |

Note: Kinds of the inert particles: po-Si; porous silica, ag-po-Si; agglomerated porous silica

TABLE 2

|  |  |  | Example 5 | Example 6 | Example 7 | Example 8 | Example 9 |
|---|---|---|---|---|---|---|---|
| Inert particle (A) | Kind |  | Kaolin | Kaolin | Kaolin | Kaolin | Kaolin |
|  | Constitution element |  | Si, Al | Si, Al | Si, Al | Si, Al | Si, Al |
|  | Vickers hardness | — | 80 | 80 | 80 | 80 | 80 |
|  | Addition amount | wt. % | 0.07 | 0.5 | 0.95 | 0.5 | 0.5 |
|  | Average diameter dA | μm | 0.66 | 0.66 | 0.66 | 0.66 | 0.66 |
|  | Average primary diameter | μm | — | — | — | — | — |
|  | Production method |  | Synthesis | Synthesis | Synthesis | Synthesis | Synthesis |
| Inert particle- (B) | Kind |  | CaCO3 | po-Si | po-Si | po-Si | po-Si |
|  | Constitution element |  | Ca | Si | Si | Si | Si |
|  | Vickers hardenss | — | 128 | 275 | 275 | 275 | 275 |
|  | Addition amount | wt. % | 0.26 | 0.09 | 0.05 | 0.05 | 0.05 |
|  | Average diameter dB | μm | 1.2 | 2.3 | 2.3 | 2.3 | 2.3 |
|  | Production process |  | Synthesis | Synthesis | Synthesis | Synthesis | Synthesis |
| Film thickness |  | μm | 4.6 | 4.6 | 4.6 | 1.2 | 9.8 |
| SRa |  | nm | 21 | 74 | 67 | 29 | 43 |
| SRz |  | nm | 1210 | 1480 | 1400 | 1315 | 1325 |
| Air escaping rate |  | mmHg/hr | 31 | 85 | 85 | 83 | 92 |
| End staggering width |  | μm | 72 | 105 | 308 | 230 | 330 |
| Abrasion resistance | White powder |  | ◎ | ○ | ◎ | ◎ | ◎ |
|  | Scratch |  | ◎ | ○ | ◎ | ◎ | ◎ |
| Windability of product ribbon slitting |  |  | ○ | ○ | ○ | ○ | ○ |

Note: Kinds of the inert particles: po-Si; porous silica, CaCO3; Calcium carbonate

TABLE 3

|  |  |  | Compara. Example 1 | Compara. Example 2 | Compara. Example 3 | Compara. Example 4 |
|---|---|---|---|---|---|---|
| Inert particle (A) | Kind |  | Kaolin | ag-po-Si | Kaolin | Kaolin |
|  | Constitution element |  | Si, Al | Si | Si, Al | Si, Al |
|  | Vickers hardness | — | 80 | 170 | 80 | 80 |
|  | Addition amount | wt. % | 0.500 | 0.150 | 0.500 | 0.500 |
|  | Average diameter dA | μm | 0.66 | 1.70 | 0.66 | 0.66 |
|  | Average primary diameter | μm | — | 0.012 | — | — |
|  | Production method |  | Synthesis | Synthesis | Synthesis | Synthesis |
| Inert particle (B) | Kind |  | None | None | po-Si | po-Si |
|  | Constitution element |  | — | — | Si | Si |
|  | Vickers hardness | — | — | — | 275 | 275 |
|  | Addition amount | wt. % | — | — | 0.005 | 0.100 |
|  | Average diameter dB | μm | — | — | 2.3 | 2.3 |
|  | Production process |  | Synthesis | Synthesis | Synthesis | Synthesis |
| Film thickness |  | μm | 4.6 | 4.6 | 4.6 | 4.6 |

TABLE 3-continued

|  |  | Compara. Example 1 | Compara. Example 2 | Compara. Example 3 | Compara. Example 4 |
|---|---|---|---|---|---|
| SRa | nm | 30 | 31 | 32 | 71 |
| SRz | nm | 920 | 1050 | 710 | 1510 |
| Air escaping rate | mmHg/hr | 42 | 61 | 45 | 140 |
| End staggering width | μm | 401 | 109 | 740 | 710 |
| Abrasion resistance | White powder | X | X | Δ | ◯ |
|  | Scratch | Δ | Δ | Δ | Δ |
| Windability of product ribbon in slitting |  | Δ | Δ | X | X |

Note: Kinds of the inert particles: po-Si; porous silica, ag-po-Si; agglomerated porous silica

TABLE 4

|  |  |  | Compara. Example 5 | Compara. Example 6 | Compara. Example 7 | Compara. Example 8 |
|---|---|---|---|---|---|---|
| Inert particle (A) | Kind |  | Kaolin | Kaolin | Kaolin | Kaolin |
|  | Constitution element |  | Si, Al | Si, Al | Si, Al | Si, Al |
|  | Vickers hardness | — | 80 | 80 | 80 | 80 |
|  | Addition amount | wt. % | 0.05 | 1.50 | 0.50 | 0.50 |
|  | Average diameter $d_A$ | μm | 0.66 | 0.66 | 0.66 | 0.66 |
|  | Average primary diameter | μm | — | — | — | — |
|  | Production method |  | Synthesis | Synthesis | Synthesis | Synthesis |
| Inert particle (B) | Kind |  | po-Si | po-Si | po-Si | po-Si |
|  | Constitution element |  | Si | Si | Si | Si |
|  | Vickers hardness | — | 275 | 275 | 275 | 275 |
|  | Addition amount | wt. % | 0.050 | 0.050 | 0.050 | 0.050 |
|  | Average diameter $d_B$ | μm | 2.3 | 2.3 | 2.3 | 2.3 |
|  | Production process |  | Synthesis | Synthesis | Synthesis | Synthesis |
| Film thickness |  | μm | 4.6 | 4.6 | 0.5 | 12.0 |
| SRa |  | nm | 20 | 84 | 24 | 36 |
| SRz |  | nm | 615 | 1240 | 1210 | 1080 |
| Air escaping rate |  | mmHg/hr | 9 | 125 | 19 | 140 |
| End staggering width |  | μm | 1095 | 940 | 895 | 629 |
| Abrasion resistance | White powder |  | X | Δ | ◯ | ◯ |
|  | Scratch |  | X | Δ | ◯ | ◯ |
| Windability of product ribbon in slitting |  |  | X | X | X | X |

Notes: Kinds of the inert particles: po-Si; porous silica,

What is claimed is:

1. A biaxially oriented polyester film for heat-sensitive transfer ribbon having a thickness of from 1.0 to 10.0 μm and composed of a polyester composition containing two or more kinds of inert particles having different average particle diameters, wherein each of said inert particles contains at least one kind of element selected from Al, Si, Ca and Mg, and wherein the center-line average roughness (SRa) and the 10 points average roughness (SRz) of the film surface are 10 to 80 nm and 700 to 1,500 nm, respectively, the air-escaping rate between films is 20 to 120 mmHg/hr, and the end staggering width is 0 to 500 μm when a film roll slit to ½ inch wide is wound at a speed of 250 m/min.

2. A biaxially oriented polyester film described in claim 1 wherein the biaxially oriented polyester film contains 0.05 to 1.0% by weight of inert particle A having an average particle diameter of from 0.3 to 1.0 μm and 0.005 to 0.5% by weight of inert particle B having an average particle diameter of from 0.5 to 5.0 μm, and that the average particle diameter ($d_A$) of the inert particle A and the average particle diameter ($d_B$) of the inert particle B satisfy the formula $d_A < d_B$.

3. A biaxially oriented polyester film described in claim 2 wherein the average particle diameter ($d_A$) of the inert particle A is 0.7 to 1.0 μm and the average particle diameter ($d_B$) of the inert particle B is 1.5 to 2.8 μm.

4. A biaxially oriented polyester film described in claim 2 or 3 wherein the Vickers hardness of the inert particle B is higher than the Vickers hardness of the inert particle A.

5. A biaxially oriented polyester film described in claim 1 wherein the polyester composition constituting the polyester film contains a reclaimed and recycled polyester composition as a part thereof or the film-constituting composition is composed exclusively of a reclaimed and recycled polyester composition.

6. A biaxially oriented polyester film described in claim 5 wherein the polyester composition constituting the polyester film is composed exclusively of a reclaimed and recycled film and wherein the center-line average roughness (SRa(1)) of the surface of the film before being reclaimed and recycled and the center-line average roughness (SRa(2)) of the surface of the film manufactured exclusively from the reclaimed film satisfy the following formula.

$$0.8 \leq SRa(2)/SRa(1) \leq 1.2$$

7. A method of using the biaxially oriented polyester film described in claim 1 which comprises laminating said film with a heat-sensitive transfer ink for the manufacture of a heat-sensitive transfer ribbon.

* * * * *